United States Patent
Toba et al.

(10) Patent No.: US 8,072,231 B2
(45) Date of Patent: Dec. 6, 2011

(54) TESTING METHOD OF WAFER WITH THIN-FILM MAGNETIC HEADS AND MANUFACTURING METHOD OF THIN-FILM MAGNETIC HEAD

(75) Inventors: Isamu Toba, Tokyo (JP); Yasuhiro Hasegawa, Tokyo (JP); Koichi Otani, Tokyo (JP); Takamitsu Sakamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 420 days.

(21) Appl. No.: 12/473,647

(22) Filed: May 28, 2009

(65) Prior Publication Data

US 2010/0302662 A1   Dec. 2, 2010

(51) Int. Cl.
*G01R 31/02* (2006.01)
*G01R 33/12* (2006.01)
(52) U.S. Cl. .................. 324/762.01; 324/210; 360/110
(58) Field of Classification Search .......... None
See application file for complete search history.

(56) References Cited

U.S. PATENT DOCUMENTS

| 6,623,330 B2 * | 9/2003 | Fukuroi .................. 451/5 |
| 7,359,152 B2 * | 4/2008 | Matono et al. ........... 360/125.33 |
| 7,821,744 B2 * | 10/2010 | Takahashi et al. ............ 360/316 |
| 2007/0105248 A1 | 5/2007 | Katoh |
| 2008/0100960 A1 | 5/2008 | Kakehi et al. |
| 2008/0291579 A1 * | 11/2008 | Uesugi et al. ............... 360/314 |

FOREIGN PATENT DOCUMENTS

JP   A-06-333213   12/1994

* cited by examiner

*Primary Examiner* — Vinh Nguyen
(74) *Attorney, Agent, or Firm* — Oliff & Berridge, PLC (57) ABSTRACT

A testing method of a wafer provided with a plurality of thin-film magnetic heads is provided. Each of the plurality of thin-film magnetic heads includes a main pole layer, a first test pad formed on the wafer and electrically connected with an extended top end section of the main pole layer and a second test pad formed on the wafer and electrically connected with a back end section of the main pole layer. The testing method includes a step of measuring an electrical resistance between the first test pad and the second test pad, a step of judging whether the measured electrical resistance is within a set range, and a step of discriminating that the thin-film magnetic head is a non-defective product when the measured electrical resistance is within the set range.

14 Claims, 13 Drawing Sheets

TESTING METHOD OF WAFER WITH THIN-FILM MAGNETIC HEADS AND MANUFACTURING METHOD OF THIN-FILM MAGNETIC HEAD

BACKGROUND OF THE INVENTION

1. Field of the Invention

The present invention relates to a testing method of a wafer provided with thin-film magnetic heads, and to a manufacturing method of a thin-film magnetic head using the testing method of the wafer.

2. Description of the Related Art

A recent thin-film magnetic head, particularly a recent inductive write head element has a quite fine and complicated structure. For example, a pole of the write head element has an elongated or slender shape and is subjected to influences of various processes such as etching process or resist-removal process after formation thereof because a magnetic shield layer for preventing blur in writing magnetic field will be formed around this pole. Thus, in the recent thin-film magnetic heads, defects such as a breakage or a disconnection of the pole are easy to come to occur, and it is required to certainly detect such a defect during a wafer process and to remove the thin-film magnetic heads having the defect.

As a conventional method of detecting defect in each thin-film magnetic head during the wafer process, there is an optical inspection method using a SEM (scanning electron microscope). However, because this inspection method using the SEM bases upon visual observation, discovering of a defect in each thin-film magnetic head itself is difficult and also great deal of time is required. For example, it may be necessary thirty seconds or more to check only one thin-film magnetic head and therefore several hundred hours to check all of the thin-film magnetic heads on the wafer. Thus, it was impossible to perform inspection for all of the thin-film magnetic heads fabricated to maintain quality of shipped thin-film magnetic heads well.

US 2008/100960 (Kakehi et al) discloses an insulation characteristic monitoring method of measuring whether insulation is ensured between layers of thin-film magnetic head elements formed on a wafer. This method uses a specific insulation-monitor element formed as a part of a large number of magnetic head elements on a wafer. An insulation characteristic between specially insulated layers in the insulation-monitor element is measured to infer the insulation characteristics of the general magnetic head elements from analogy.

However, because the insulation characteristics monitoring method described in Kakehi et al only checks whether there is insufficient insulation namely a short circuit or not, it is impossible to discriminate whether there is a defective in the head such as a breakage or disconnection of the magnetic pole. Further, because this insulation characteristics monitoring method checks the specific insulation-monitor element only but does not check all of the general magnetic head elements at all, it is difficult to increase reliability of the monitoring.

JP 6-333213A (Umemoto et al) discloses a method of testing a withstand voltage between an upper pole layer and a coil layer of each thin-film magnetic head formed on a wafer.

However, the withstand voltage test method described in Umemoto et al only detects whether a heavy-current flows or not to discriminate that there is no insulation tolerance and this thin-film magnetic head is defective when the heavy-current flows. Thus, this method cannot discriminate whether there is a defective in the head such as a breakage or disconnection of the magnetic pole at all.

SUMMARY OF THE INVENTION

It is therefore an object of the present invention to provide a testing method of a wafer provided with thin-film magnetic heads and a manufacturing method of a thin-film magnetic head, whereby a defective of a magnetic pole such as a breakage or disconnection can be easily detected with reliability and also it is possible to test all of the thin-film magnetic heads on the wafer.

Before describing the present invention, meaning of terms used in this specification will be defined. In a multi-layered structure of a thin-film magnetic head formed on a element-formed surface or a surface on which elements are formed, of a substrate, a layer located nearer to the substrate than a reference layer is called as a "lower" layer of the reference layer and a section of a layer, which section is located nearer to the substrate than other section of the layer is called as a "lower" section of the layer. Also, a layer located farther from the substrate than a reference layer or located at the opposite side from the substrate with respect to a reference layer is called as an "upper" layer of the reference layer and a section of a layer, which section is located farther from the substrate than other section of the layer is called as an "upper" section of the layer. Furthermore, an "extended top end section" is an end section located in an air bearing surface (ABS) side (left-hand side in FIG. 2) of a thin-film magnetic head and outwardly extended from the ABS. A "back end section" is an end section located in the opposite side of the ABS (right-hand side in FIG. 2) of the thin-film magnetic head.

According to the present invention, a testing method of a wafer having a plurality of thin-film magnetic heads is provided. Each of the plurality of thin-film magnetic heads includes a main pole layer, a first test pad formed on the wafer and electrically connected with an extended top end section of the main pole layer and a second test pad formed on the wafer and electrically connected with a back end section of the main pole layer. The testing method includes a step of measuring an electrical resistance between the first test pad and the second test pad, a step of judging whether the measured electrical resistance is within a set range, and a step of discriminating that the thin-film magnetic head is a non-defective product when the measured electrical resistance is within the set range.

Using the first and second test pads formed on the surface of the wafer, electrical resistance value between the extended top end section and the back end section of the main pole layer is measured. Then, whether the measured electrical resistance value is within a set range or not is judged and if it is within the set range, discriminated is the thin-film magnetic head is a non-defective product. Since whether the thin-film magnetic head is good product or not can be discriminated only by measuring the electrical resistance between the test pads and by judging the measured value is within the set range or not, a defective in a narrow part of the magnetic pole such as a breakage or disconnection can be easily detected with reliability. Also, since the test can be performed in a short period of time, it is possible to test all of the thin-film magnetic heads on the wafer.

It is preferred that the measuring step, the judging step and the discriminating step are executed for all of the thin-film magnetic heads on the wafer.

It is also preferred that the extended top end section of the main pole layer is an end section extended outside of a location of an ABS of the thin-film magnetic head.

It is further preferred that the second test pad is electrically connected with the back end section of the main pole layer via a write shield layer of the thin-film magnetic head.

According to the present invention, also, a manufacturing method of a thin-film magnetic head includes a step of forming a plurality of thin-film magnetic heads on a wafer such that each of the plurality of thin-film magnetic heads includes a main pole layer, a first test pad formed on the wafer and electrically connected with an extended top end section of the main pole layer and a second test pad formed on the wafer and electrically connected with a back end section of the main pole layer, a step of measuring an electrical resistance between the first test pad and the second test pad, a step of judging whether the measured electrical resistance is within a set range, and a step of discriminating that the thin-film magnetic head is a non-defective product when the measured electrical resistance is within the set range.

Using the first and second test pads formed on the surface of the wafer, electrical resistance value between the extended top end section and the back end section of the main pole layer is measured. Then, whether the measured electrical resistance value is within a set range or not is judged and if it is within the set range, discriminated is the thin-film magnetic head is a non-defective product. Since whether the thin-film magnetic head is good product or not can be discriminated only by measuring the electrical resistance between the test pads and by judging the measured value is within the set range or not, a defective in a narrow part of the magnetic pole such as a breakage or disconnection can be easily detected with reliability. Also, since the test can be performed in a short period of time, it is possible to test all of the thin-film magnetic heads on the wafer.

It is preferred that the method further includes a step of discriminating that the thin-film magnetic head is a defective product to be excluded from shipped products when the measured electrical resistance is not within the set range.

It is also preferred that the measuring step, the judging step and the discriminating step are executed for all of the thin-film magnetic heads on the wafer.

It is further preferred that the extended top end section of the main pole layer is an end section extended outside of a location of an ABS of the thin-film magnetic head.

It is still further preferred that the second test pad is electrically connected with the back end section of the main pole layer via a write shield layer of the thin-film magnetic head.

It is further preferred that the method further includes a step of cutting the wafer to obtain a plurality of row bars each having a plurality of thin-film magnetic heads aligned, a step of lapping an ABS of each of the plurality of row bars, and a step of cutting the lapped row bar to separate into individual thin-film magnetic heads. In this case, preferably, the lapping step includes controlling a lapping amount by monitoring a resistance value of a lapping sensor. Also, preferably, the method further includes a step of preliminarily lapping a reference row bar cut from the wafer, a step of measuring a resistance value of a lapping sensor of the lapped reference row bar, and a step of measuring a magnetic write width (MWW) of every thin-film magnetic head cut from the reference row bar.

In this case, it is preferred that the method further includes a step of calculating an MWW of every thin-film magnetic head of an intended row bar other than the reference row bar obtained from the wafer, from a difference between the electrical resistance of the every thin-film magnetic head in the intended row bar and the electrical resistance of the every thin-film magnetic head obtained from the reference row bar, when the resistance values of the lapping sensors are the same in the intended row bar and the reference row bar. More preferably, the method further includes a step of lapping the intended row bar by monitoring the resistance value of the lapping sensor in the intended row bar so that a difference between an aimed MWW and the calculated MWW becomes zero.

Further objects and advantages of the present invention will be apparent from the following description of the preferred embodiments of the invention as illustrated in the accompanying drawings.

BRIEF DESCRIPTION OF THE DRAWINGS

FIG. 3b shows a view illustrating in detail a part of the wafer shown in FIG. 3a;

DESCRIPTION OF THE PREFERRED EMBODIMENTS

Figure 1:
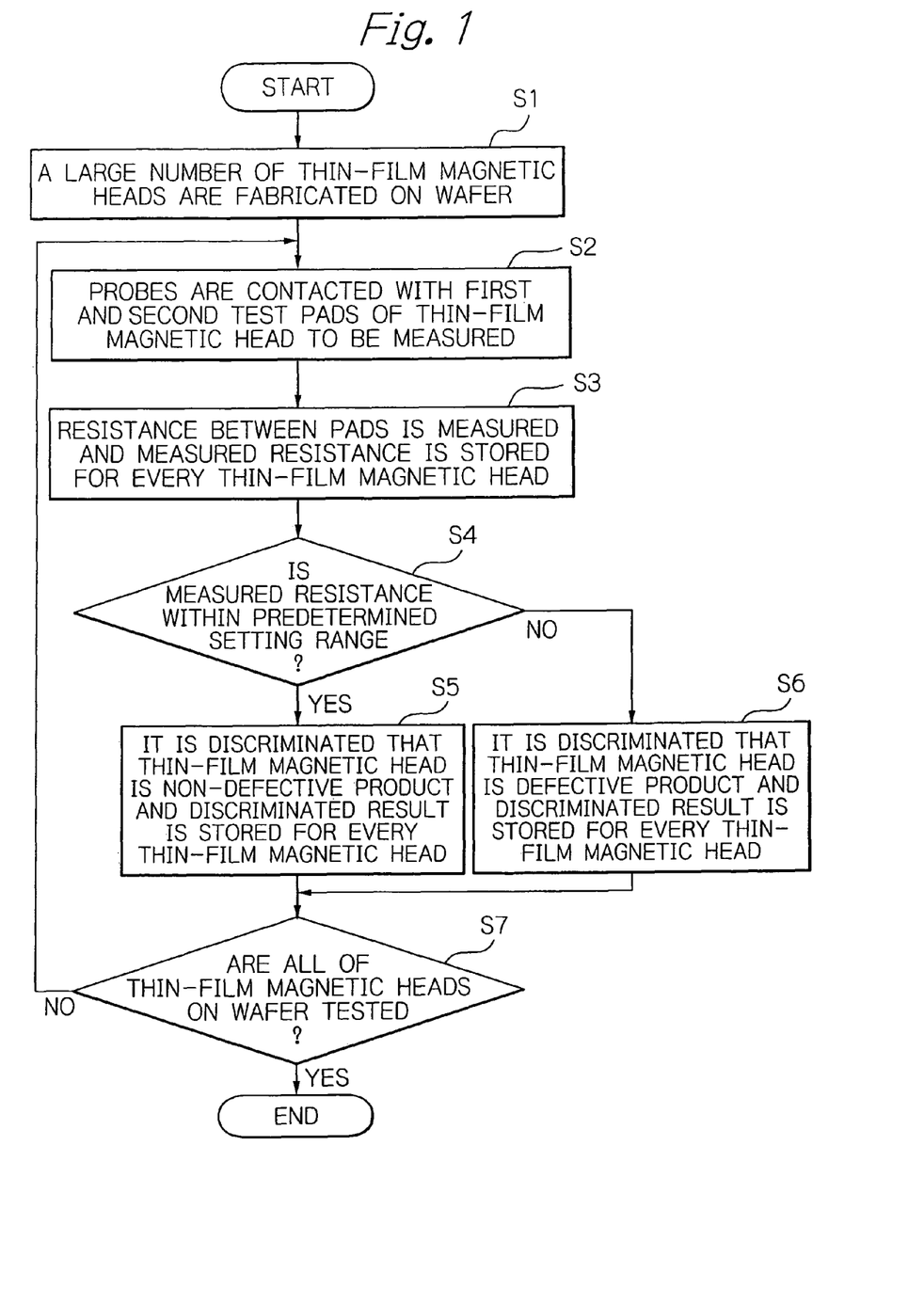
FIG. 1 shows a flow chart schematically illustrating a wafer process in a manufacturing method of a thin-film magnetic head as an embodiment according to the present invention.
Figure 2:
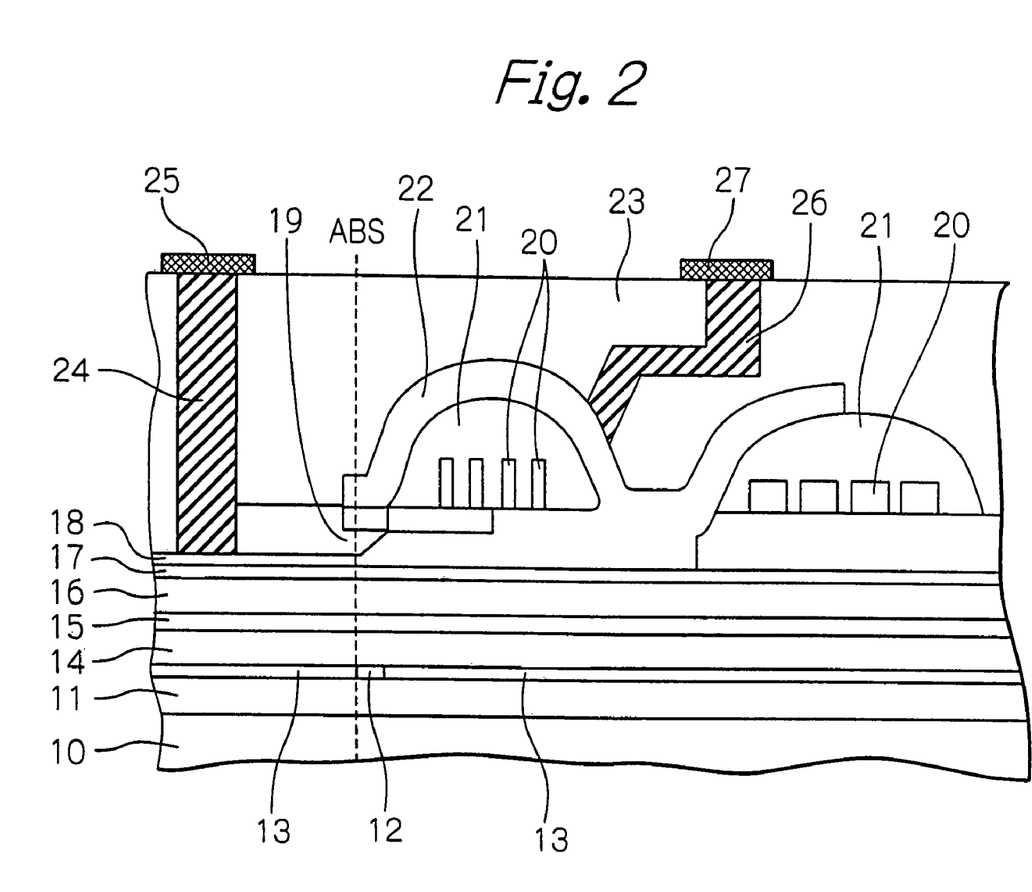
FIG. 2 shows a central sectional view schematically illustrating a structure of each thin-film magnetic head fabricated in the wafer process shown in FIG. 1.

FIG. 1 schematically illustrates a wafer process in a manufacturing method of a thin-film magnetic head as an embodiment according to the present invention, and FIG. 2 schematically illustrates a structure of each thin-film magnetic head fabricated in the wafer process shown in FIG. 1.

At first, as shown in FIG. 1, a large number of thin-film magnetic heads are formed on a thin-film magnetic head wafer (Step S1 in FIG. 1). That is, many composite type thin-film magnetic heads, each of which is formed by laminating an inductive write head element having a perpendicular magnetic recording structure on a tunnel magnetoresistive effect (TMR) read head element or a giant magnetoresistive effect (GMR) read head element, are fabricated on the wafer in matrix.

In each thin-film magnetic head, as shown in FIG. 2, an under insulation layer 10 is laminated on the wafer substrate and a lower shield layer 11 that also serves as a lower electrode layer is laminated on the under insulation layer 10. On this lower shield layer 11, a TMR multilayer 12 and an insulation layer 13 are laminated.

Although it is not shown in the figure, the TMR multilayer 12 consists of a multi-layered structure with a lower metal layer, a pinning layer made of an anti-ferromagnetic material, a pinned layer, a tunnel barrier layer, a free layer and a cap layer.

On the TMR multilayer 12 and the insulation layer 13, an upper shield layer 14 that also serves as an upper electrode layer is laminated. The TMR read head element is mainly configured by the lower shield layer 11, the TMR multilayer 12, the insulation layer 13 and the upper shield layer 14.

On the upper shield layer 14, an element-separation shield layer 16 sandwiched between insulation layers 15 and 17, for separating the TMR read head element and the inductive write head element is laminated.

On the element-separation shield layer 16 and the insulation layer 17, laminated is the inductive write head element including a main pole layer 18, an insulation gap layer 19, a write coil layer 20, a write coil insulation layer 21 and write shield layer 22. A protection layer 23 is laminated on this inductive write head element.

According to the present invention, in particular, one end of a through hole conductor 24 is electrically connected with an extended top end section of the main pole layer 18, and the other end of the through hole conductor 24 is electrically connected with a first test pad 25 formed on a top surface of the wafer. As will be noted from FIG. 2, the extended top end section of the main pole layer 18, the through hole conductor 24 and the first test pad 25 are positioned outside of the location of the ABS. Therefore, these portions will be removed when the heads are lapped to expose their ABSs in a machining process executed later. A back end section of the main pole layer 18 is electrically and magnetically connected with the write shield layer 22. One end of a through hole conductor 26 is electrically connected with the write shield layer 22, and the other end of the through hole conductor 26 is electrically connected with a second test pad 27 formed on the top surface of the wafer. Thus, an electrical resistance value between the first test pad 25 and the second test pad 27 includes an electrical resistance value between the extended top end section and the back end section of the main pole layer 18. Hereinafter, to simplify the description, the electrical resistance value between these test pads is called as a pole resistance value.

Next, a testing method of each thin-film magnetic head fabricated by such wafer process will be described.

Figure 3A:
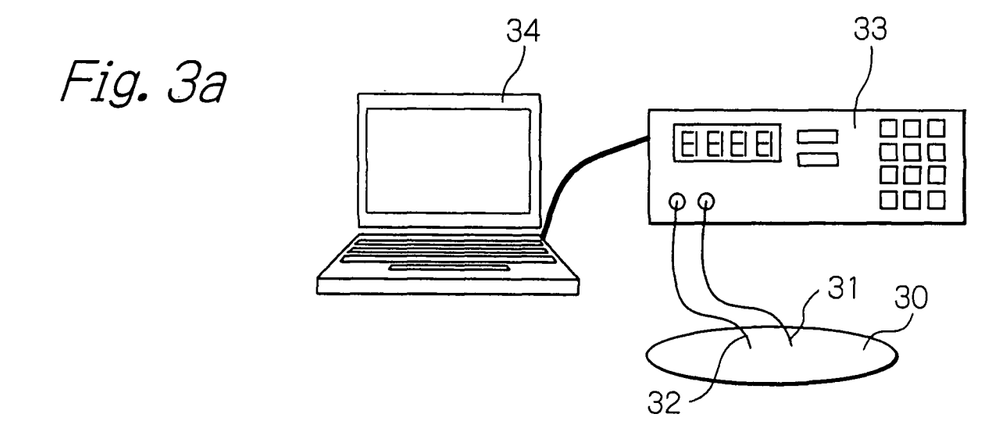
FIG. 3a shows a view schematically illustrating a method of measuring an electrical resistance value in the embodiment of FIG. 1.
Figure 3B:
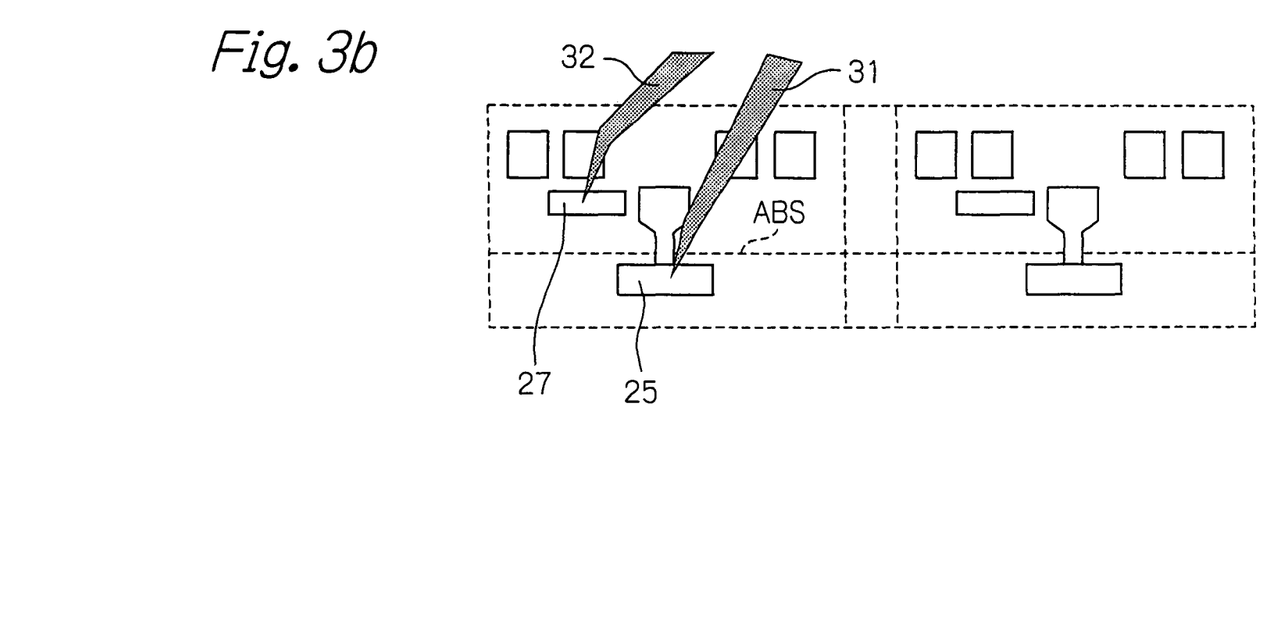

FIG. 3a schematically illustrates a method of measuring a pole resistance value in the embodiment of FIG. 1, and FIG. 3b illustrates in detail a part of the wafer shown in FIG. 3a. As shown in these figures, first, top ends of a probe 31 and a probe 32 are contacted to the first test pad 25 and the second test pad 27 of one of many thin-film magnetic heads formed on a wafer 30, respectively (Step S2 in FIG. 1).

These probes 31 and 32 are electrically connected with signal input terminals of a resistance measure 33, and digital signal output terminals of this resistance measure 33 are connected with a computer 34.

By feeding a small current from the resistance measure 33 through the probes 31 and 32 to the main pole layer 18, an electrical resistance value between the first and second test pads 25 and 27 or between the extended top end section and the back end section of the main pole layer 18, that is a pole resistance value, is measured, and then the measured resistance value is stored in a memory (not shown) of the computer 34 for every thin-film magnetic head (Step S3 in FIG. 1).

Then, it is judged whether the measured pole resistance value is within a predetermined set range or not (Step S4 in FIG. 1). In this embodiment, "predetermined set range" is a range of ±5-10% with respect to the median of pole resistance values of all thin-film magnetic heads on one wafer.

If the measured pole resistance value is within the set range (in case of YES), it is discriminated that the thin-film magnetic head is a non-defective product and the discriminated result is stored in the memory for every thin-film magnetic head (Step S5 in FIG. 1).

If the measured pole resistance value is not within the set range (in case of NO), it is discriminated that the thin-film magnetic head is a defective product and the discriminated result is stored in the memory for every thin-film magnetic head (Step S6 in FIG. 1). This defective product will be excluded from shipped products later.

Then, it is judged whether all of the thin-film magnetic heads formed on the wafer are tested or not (Step S7 in FIG. 1). If all of the thin-film magnetic heads are not tested yet (in case of NO), the program returns to Step S2 to repeat the processes of Steps S2-S7. If all of the thin-film magnetic heads on the wafer are tested (in case of YES), this testing procedure is finished.

Figure 4:
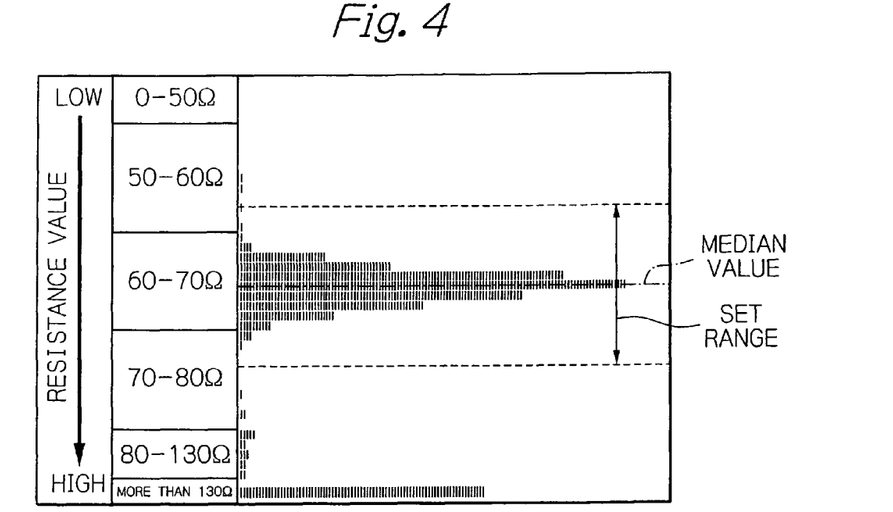
FIG. 4 shows a histogram of actually measured electrical resistance values of all of the thin-film magnetic heads on the wafer, in which the longitudinal axis indicates the electrical resistance value and the lateral axis indicates the number of the thin-film magnetic heads with the respective resistance values.

FIG. 4 illustrates a histogram of actually measured pole resistance values of main poles of all of the thin-film magnetic heads on one wafer. In the figure, the longitudinal axis indicates the measured pole resistance value and the lateral axis indicates the number of the thin-film magnetic heads with the respective resistance values.

In this example, the number of all the thin-film magnetic heads on the wafer was 600, and a median value of the measured pole resistance values was 66 Ω. The set range that is a threshold range for judging whether the product is non-defective or defective was defined as in this example a range of ±8%.

In this example, the range is set with respect to the median value of the measured resistance values rather than a mean value of the measured resistance values. This is because since the measured pole resistance value may be sometimes zero or infinite, the median value is more desirable than the mean value for obtaining an average of the population when measuring all the thin-film magnetic heads on the wafer.

The threshold range for judging whether the product is non-defective or defective should be in a range of ±5-10% with reference to the median value as hereinafter described.

Figure 5:
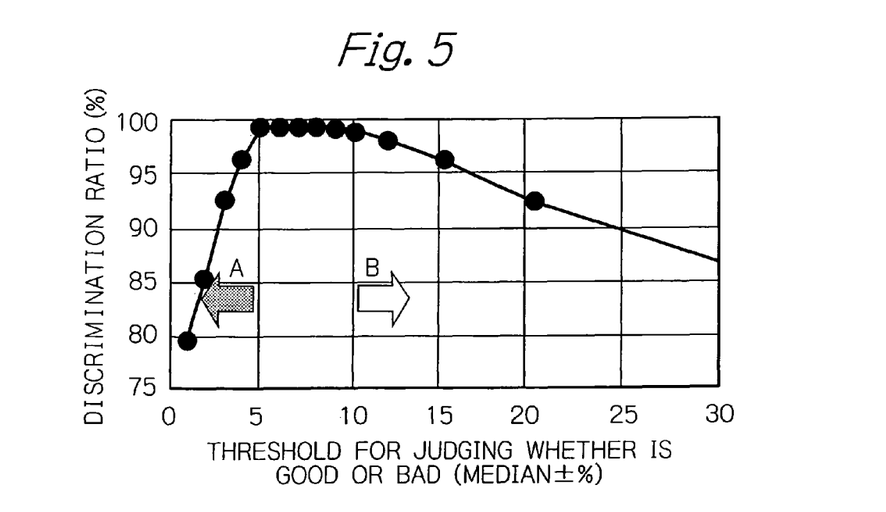
FIG. 5 shows a characteristic view illustrating a relationship between a threshold for judging whether it is a good product or a defective product and a ratio of discrimination.

First, electrical resistance values between first and second test pads or pole resistance values of thin-film magnetic heads on a wafer were measured, and also whether abnormality is present in main poles of the thin-film magnetic heads was observed by SEM. The number of samples on the wafer in this case was 50. Then, how a set threshold range for judging whether it is non-defective or defective should be decided to perform reliable discrimination was confirmed. FIG. 5 illustrates a relationship between a threshold for judging whether it is a non-defective product or a defective product and a ratio of discrimination. In the figure, the longitudinal axis indicates a discrimination ratio (%), which is a rate of good or bad judgment correctly performed, and the lateral axis indicates a set threshold for judging whether it is non-defective or defective, represented on the basis of the median value (MEDIAN±%), respectively. As will be noted from the figure, in case the threshold is within a range of ±5-10% on the basis of the median value, a discrimination ratio of approximately 100% will be attained for a good or bad judgment. As shown by an arrow A in the figure, if the threshold is smaller than ±5%, criteria become too severe and thus the number of thin-film magnetic heads discriminated as defective products even though they are non-defective may increase to fall yield. On the contrary, as shown by an arrow B in the figure, if the threshold is greater than ±10%, criteria become too loose and thus thin-film magnetic heads discriminated as non-defective products even though they are defective may appear to fall reliability.

Figure 6:
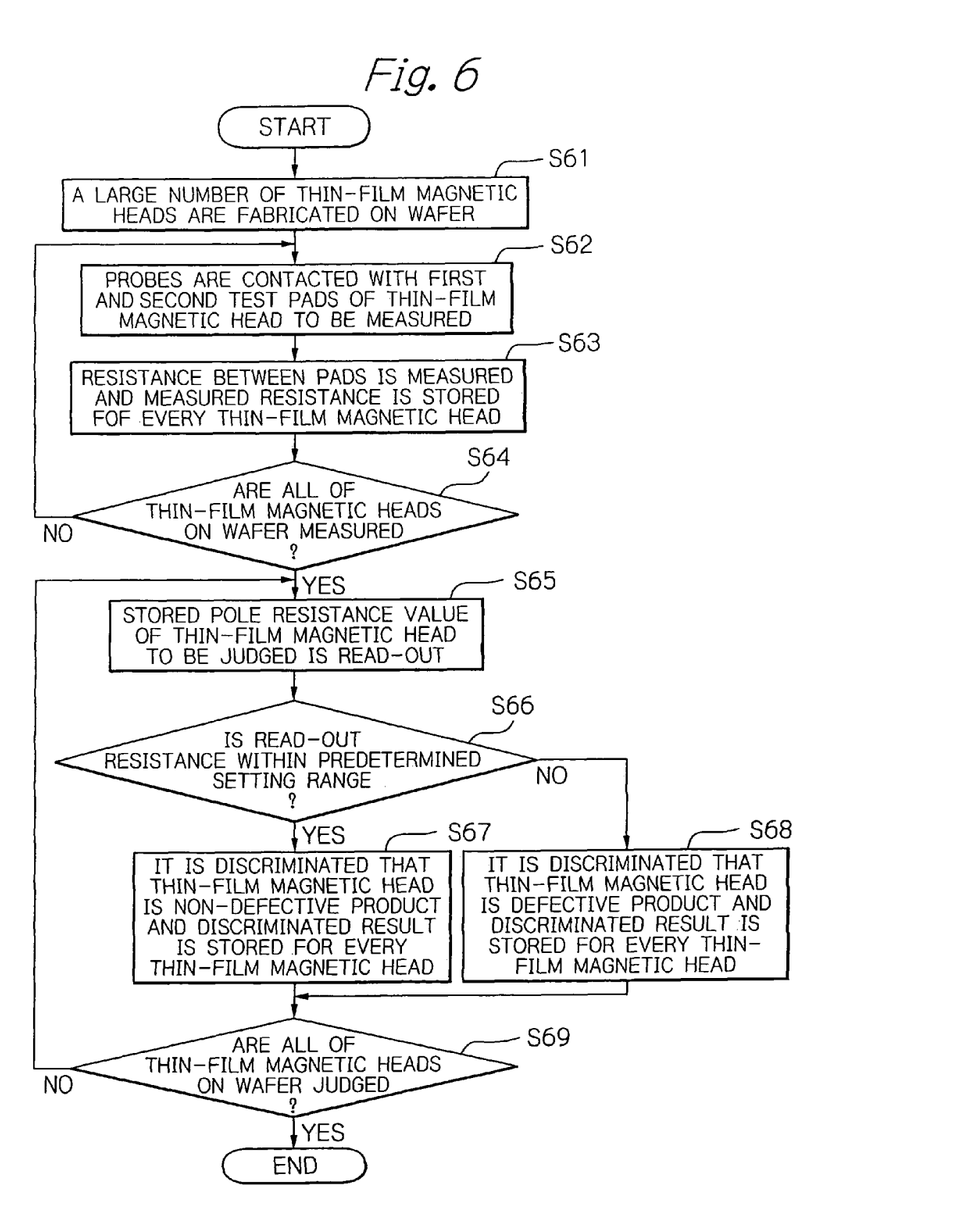
FIG. 6 shows a flow chart schematically illustrating a wafer process in a manufacturing method of a thin-film magnetic head as another embodiment according to the present invention.

FIG. 6 schematically illustrates a wafer process in a manufacturing method of a thin-film magnetic head as another embodiment according to the present invention. In this embodiment, FIGS. 2, 3a and 3b are similarly referred. The similar components as these in the embodiment of FIG. 1 are referred by the same reference numerals.

At first, as shown in FIG. 6, a large number of thin-film magnetic heads are formed on a thin-film magnetic head wafer (Step S61 in FIG. 6). That is, many composite type thin-film magnetic heads, each of which is formed by laminating an inductive write head element having a perpendicular magnetic recording structure on a TMR read head element or a GMR read head element, are fabricated on the wafer in matrix.

Figure 7:
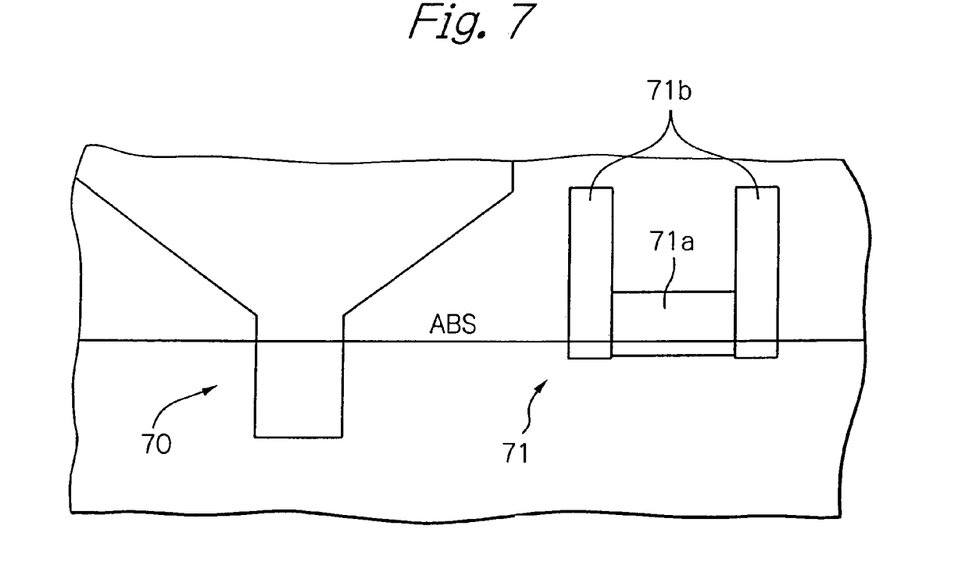
FIG. 7 shows a plane view schematically illustrating a structure of a lapping sensor fabricated in the wafer process shown in FIG. 6.

Structure of each thin-film magnetic head is the same as that in the embodiment of FIG. 1, shown in FIG. 2. However, in fact, as shown in FIG. 7, a lapping sensor 71 for detecting a lapping amount is formed near each thin-film magnetic head 70 or near several thin-film magnetic heads of the row bar. Each lapping sensor 71 consists of a resistance film such as a magnetoresistive effect (MR) film 71a formed simultaneously with the read head element in most case, lead conductors 71b electrically connected with both ends of the resistance film, and connection pads (not shown).

As shown in FIG. 3b, first, top ends of a probe 31 and a probe 32 are contacted to a first test pad 25 and a second test pad 27 of one of many thin-film magnetic heads formed on a wafer, respectively (Step S62 in FIG. 6).

These probes 31 and 32 are electrically connected with signal input terminals of a resistance measure 33, and digital signal output terminals of this resistance measure 33 are connected with a computer 34.

By feeding a small current from the resistance measure 33 through the probes 31 and 32 to the main pole layer 18, an electrical resistance value between the first and second test pads 25 and 27 or between the extended top end section and the back end section of the main pole layer 18, that is a pole resistance value, is measured, and the measured resistance value is stored in a memory (not shown) of the computer 34 for every thin-film magnetic head (Step S63 in FIG. 6).

Then, it is judged whether pole resistance values of all of the thin-film magnetic heads formed on the wafer are measured or not (Step S64 in FIG. 6). If pole resistance values of all of the thin-film magnetic heads are not measured yet (in case of NO), the program returns to Step S62 to repeat the processes of Steps S62-S64. If pole resistance values of all of the thin-film magnetic heads on the wafer are measured (in case of YES), the measured pole resistance value, stored in the memory, of the thin-film magnetic head to be judged is read-out (Step S65 in FIG. 6).

Then, it is judged whether the read-out pole resistance value is within a predetermined set range or not (Step S66 in FIG. 6). In this embodiment, "predetermined set range" is a range of ±5-10% with respect to the median of pole resistance values of all thin-film magnetic heads on one wafer.

If the read-out pole resistance value is within the set range (in case of YES), it is discriminated that the thin-film magnetic head is a non-defective product and the discriminated result is stored in the memory for every thin-film magnetic head (Step S67 in FIG. 6).

If the read-out pole resistance value is not within the set range (in case of NO), it is discriminated that the thin-film magnetic head is a defective product and the discriminated result is stored in the memory for every thin-film magnetic head (Step S68 in FIG. 6).

Then, it is judged whether all of the thin-film magnetic heads formed on the wafer are tested or not (Step S69 in FIG. 6). If all of the thin-film magnetic heads are not tested yet (in case of NO), the program returns to Step S65 to repeat the processes of Steps S65-S69. If all of the thin-film magnetic heads on the wafer are tested (in case of YES), this testing procedure is finished.

As well as the embodiment of FIG. 1, in case that the threshold is within a range of ±5-10% on the basis of the median value, a discrimination ratio of approximately 100% will be attained for a good or bad judgment.

Figure 8:
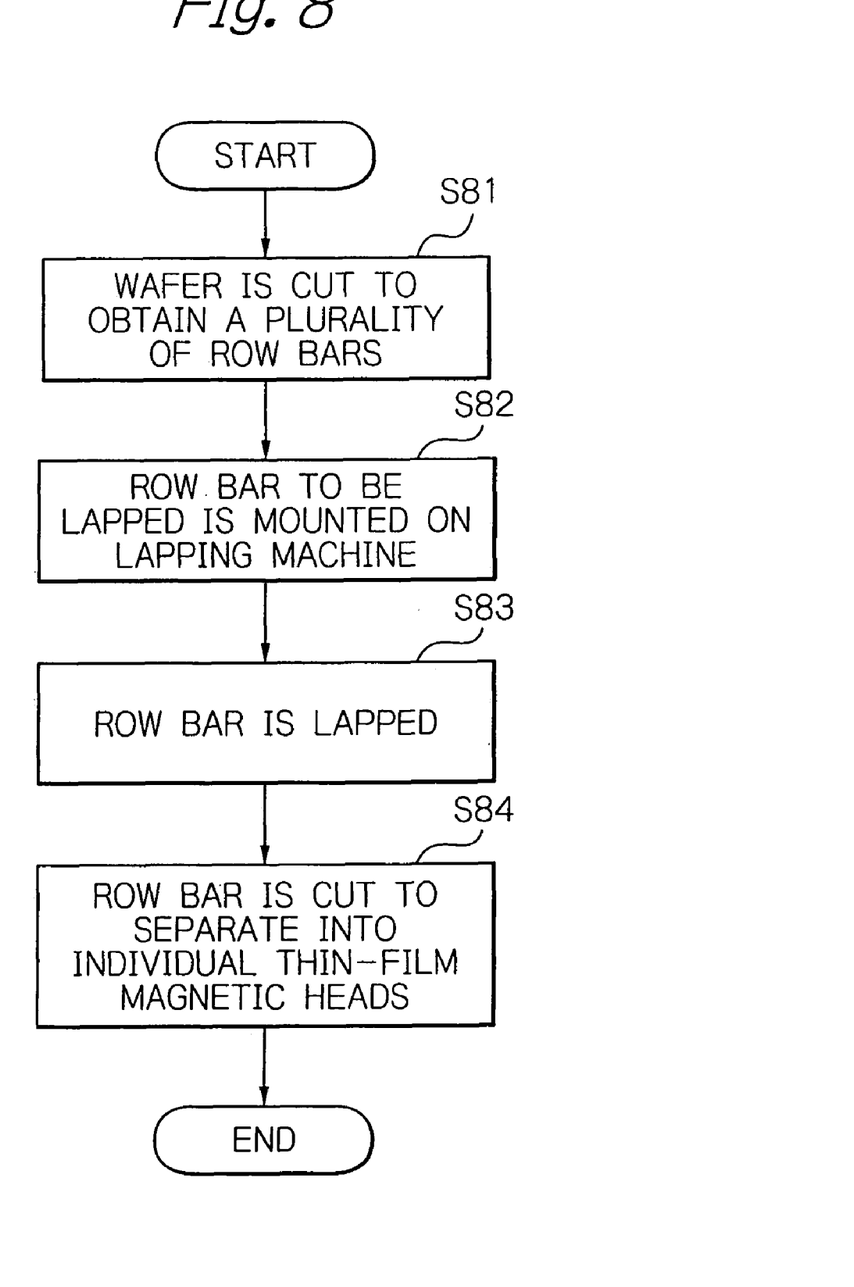
FIG. 8 shows a flow chart schematically illustrating a machining process following to the wafer process of FIG. 1 or 6 in a manufacturing method of a thin-film magnetic head according to the present invention.
Figure 9:
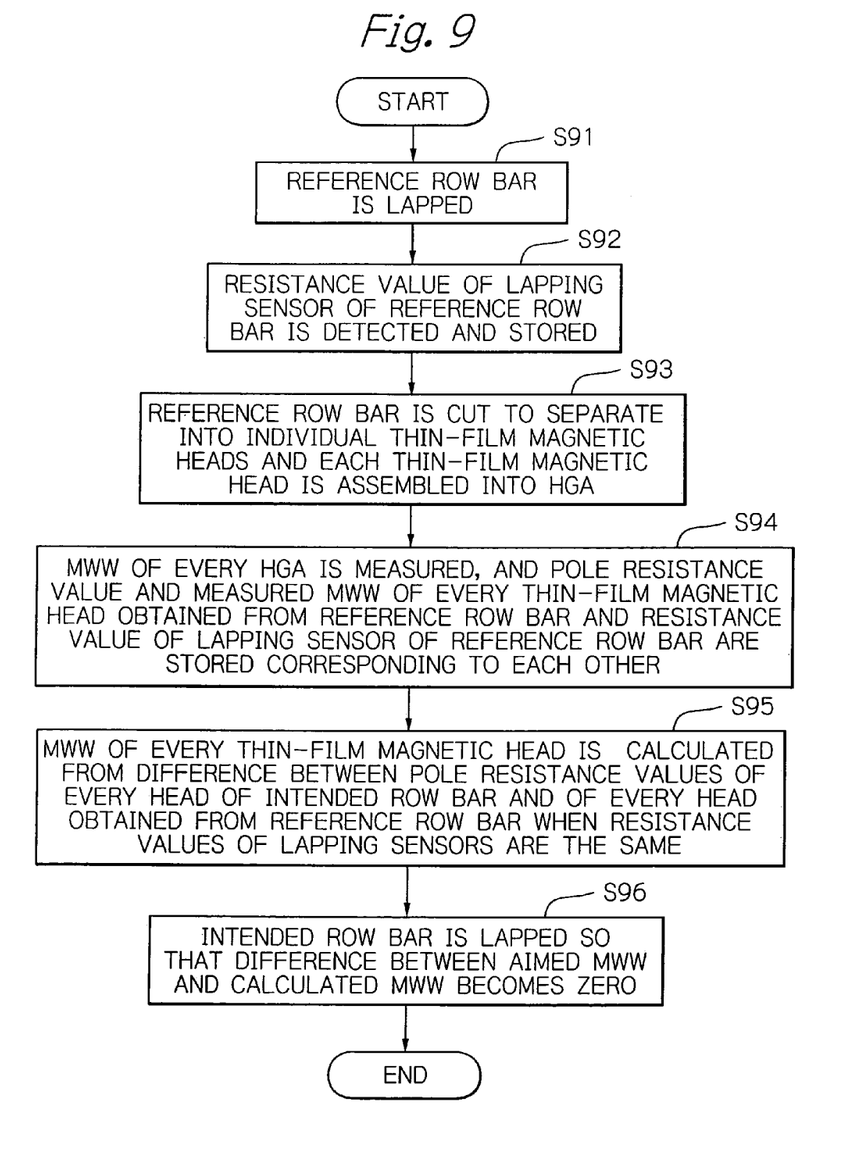
FIG. 9 shows a flow chart schematically illustrating a lapping step performed depending upon an MWW in the machining process.
Figure 10A:
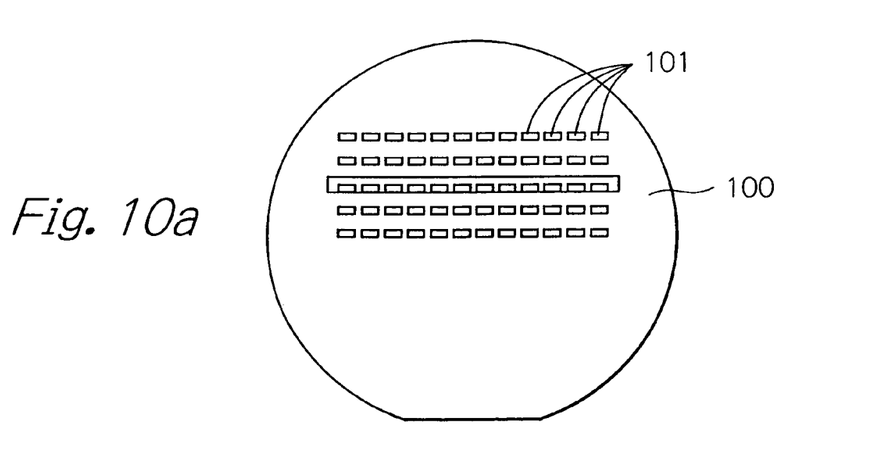
FIG. 10a shows a plane view illustrating a thin-film magnetic head wafer fabricated by the wafer process of FIG. 1 or 6.
Figure 10B:
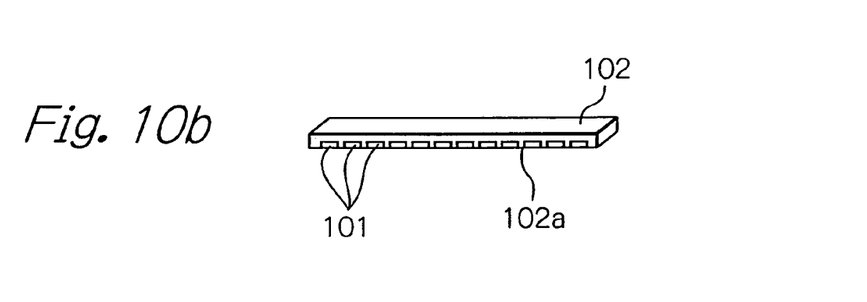
FIG. 10b shows a perspective view illustrating a row bar obtained from the wafer.
Figure 10C:
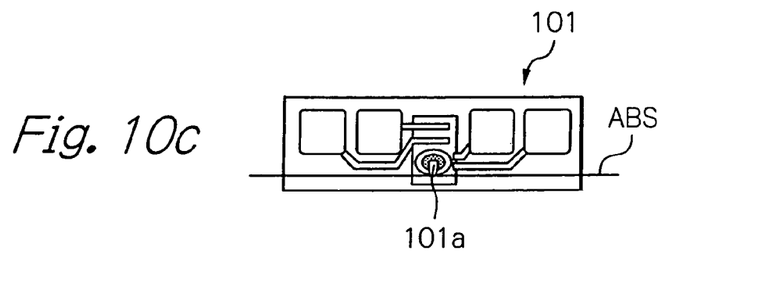
FIG. 10c shows a side view of each head illustrating the lapping of the row bar in the machining process of FIG. 8.

FIG. 8 schematically illustrates a machining process following to the wafer process of FIG. 1 or 6 in a manufacturing method of a thin-film magnetic head according to the present invention, FIG. 9 schematically illustrates a lapping step performed depending upon an MWW in the machining process, and FIGS. 10a to 10c illustrate a thin-film magnetic head wafer fabricated by the wafer process of FIG. 1 or 6, and a row bar and each thin-film magnetic head in the machining process of FIG. 8.

As shown in FIG. 10a, by the wafer process of FIG. 1 or 6, many thin-film magnetic heads 101 are formed on an integrating surface of a wafer 100 in matrix. In the machining process, first, the wafer 100 is cut to obtain row bars 102 each having a plurality of thin-film magnetic heads 101 aligned as shown in FIG. 10b (Step S81 in FIG. 8).

Then, the row bar 102 to be lapped is mounted on a lapping machine for lapping a surface 102a of the ABS side (Step S82 in FIG. 8).

Then, the row bar 102 is lapped (Step S83 in FIG. 8). This lapping step is performed until a magnetic head element part 101a of the thin-film magnetic head 101 is exposed to the ABS as shown in FIG. 10c. It is desired that a lapping amount be controlled by monitoring a resistance value of the lapping sensor.

Thereafter, the row bar 102 is cut to separate into individual thin-film magnetic heads (Step S84 in FIG. 8).

The above-mentioned machining process is a general machining process. In modification, another machining process shown in FIG. 9 may be performed for lapping the row bar to obtain an aimed MWW. Hereinafter this machining process will be described.

Suppose that a plurality of row bars have been obtained from a certain wafer at the Step S81 of FIG. 8. Then, a specific row bar, called hereinafter as a reference row bar, in the plurality of row bars is lapped by a lapping machine (Step S91 in FIG. 9).

Then, a resistance value of the lapping sensor of the lapped reference row bar is measured and stored in a memory (Step S92 in FIG. 9).

Thereafter, the reference row bar is cut to separate into individual thin-film magnetic heads and then each thin-film magnetic head is attached to a suspension to assemble a head gimbal assembly (HGA) (Step S93 in FIG. 9).

Then, an MWW of the thin-film magnetic head of every HGA obtained from the reference row bar is actually measured, and the measured MWW and the pole resistance value of the thin-film magnetic head of every HGA and the resistance value of the lapping sensor of the reference row bar are stored in the memory corresponding to each other (Step S94 in FIG. 9). Thus, mutual relation between the pole resistance value and the MWW of every thin-film magnetic head obtained from the reference row bar and the resistance value of the lapping sensor of the reference row bar are preliminarily obtained and stored in the memory. In other words, information as the MWW of a thin-film magnetic head with the pole resistance value of A ($\Omega$) becomes C ($\mu$m) when the resistance value of the lapping sensor is B ($\Omega$) will be obtained and stored. Also, information of the MWW with respect to the resistance value of the lapping sensor is obtained and stored.

Figure 11:
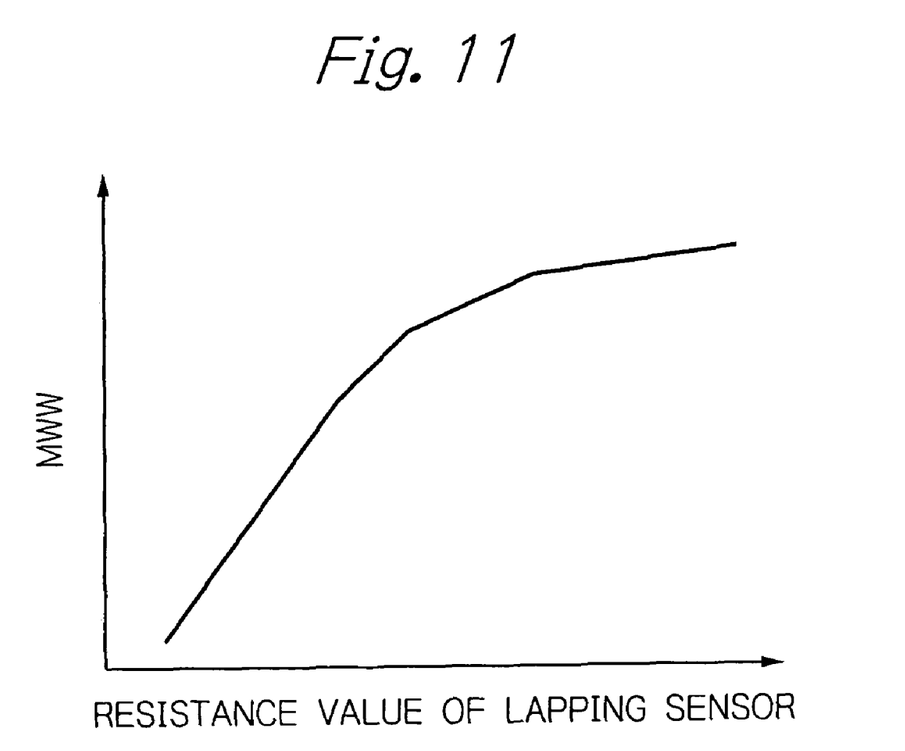
FIG. 11 shows a characteristic view very schematically illustrating a relationship between a resistance value of the lapping sensor and the MWW.

Then, as for each remaining row bar other than the reference row bar obtained from the same wafer, an MWW of every thin-film magnetic head is calculated from a difference between the pole resistance value of the every thin-film magnetic head of the intended row bar and the pole resistance value of the every thin-film magnetic head obtained from the reference row bar (Step S95 in FIG. 9). Since the mutual relation between the pole resistance value and the MWW of each thin-film magnetic head of the reference row bar is preliminarily obtained and also the pole resistance value of each thin-film magnetic head of the intended row bar is obtained, it is possible to calculate the MWW from the difference between the pole resistance value of each head obtained from the reference row bar and the pole resistance value of each head of the intended row bar. It should be noted that the calculated MWW is a value of MWW when the resistance value of the lapping sensor of the intended row bar is the same as that of the reference row bar. FIG. 11 shows a general relation between the resistance value of the lapping sensor and the MWW. Namely, if the resistance value of the lapping sensor becomes high due to increase in the lapped amount, the MWW becomes large that is becomes wider as shown in the figure.

Then, the intended row bar is mounted on the lapping machine and lapped so that a difference between an aimed MWW and the calculated MWW becomes zero (Step S96 in FIG. 9). How much the intended row bar should be lapped can be known by monitoring the resistance value of the lapping sensor of the intended row bar. Since the relation between the MWW and the resistance value of the lapping sensor is already obtained with respect to the reference row bar, it is possible to know how much the resistance value of the lapping sensor of the intended row bar should be changed in order to adjust the present MWW to the aimed MWW in the intended row bar. Thus, by monitoring the resistance value of the lapping sensor of the intended row bar, such lapping for obtaining the aimed MWW of the thin-film magnetic head with respect to the intended row bar can be performed.

Reason why there is such mutual relation between the pole resistance value and the MWW of the thin-film magnetic head will be described hereinafter.

Figure 12A:
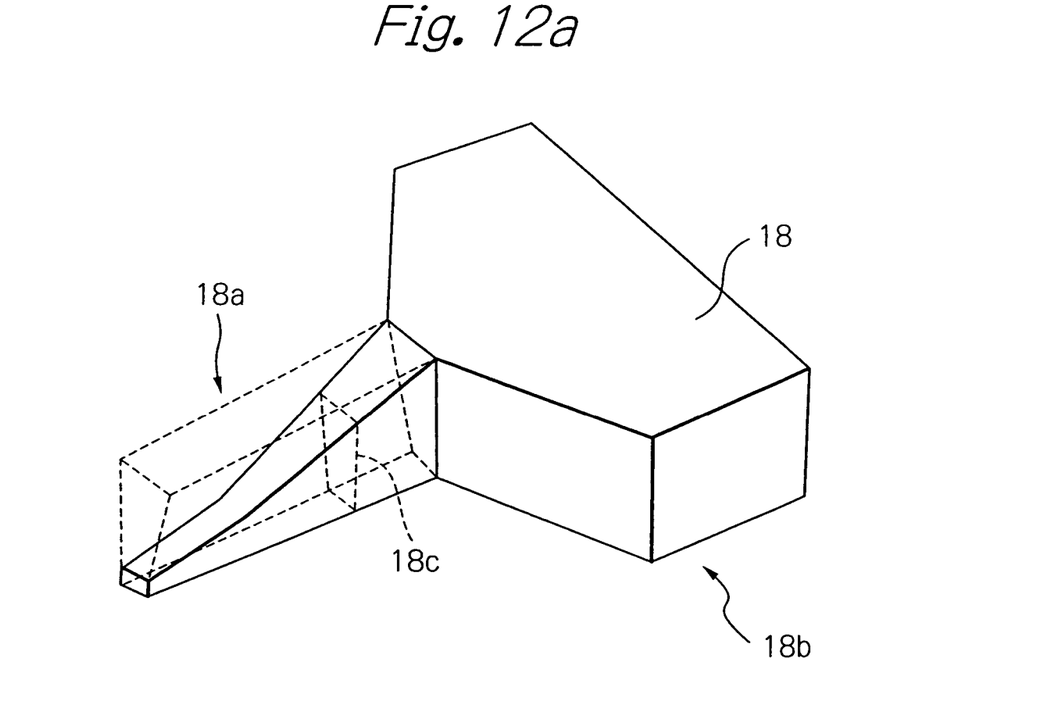
FIG. 12a shows a perspective view illustrating a shape of a main pole layer.
Figure 12B:
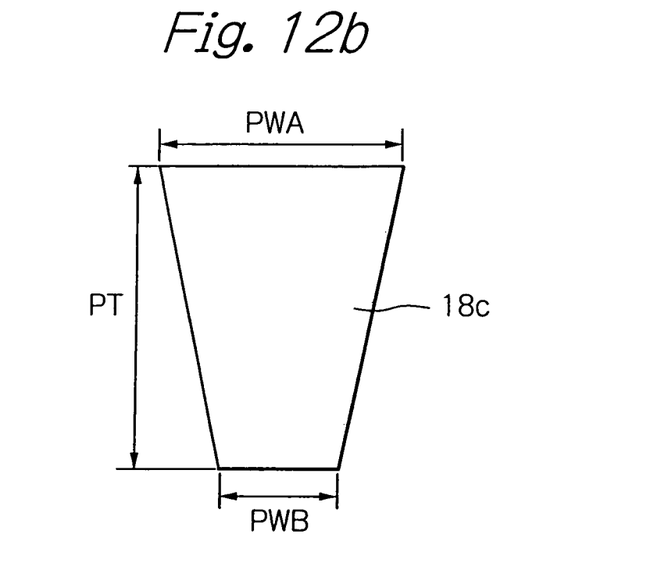
FIG. 12b shows a sectional view illustrating a section of the ABS of the main pole layer.

As shown in FIG. 12a, because width and height of a pole portion 18a of a main pole layer 18 are extremely narrower and lower than these of other portion 18b of the main pole layer 18, the pole resistance value is substantially decided depending upon a cross section of the pole portion 18a. Since a cross section S of a portion 18c that becomes as the ABS is given from S=(PWA+PWB)×PT/2, the pole resistance value is given by $\rho \times S = \rho \times (PWA+PWB) \times PT/2$, where $\rho$ is an electrical resistivity of materials of the main pole layer 18, PWA is an optical upper width of a section of the portion 18c, PWB is an optical lower width of the section of the portion 18c, and PT is an optical height of the section of the portion 18c as shown in FIG. 12b. Because an inclination angle at a sidewall of the pole portion of the main pole layer 18 is kept constant due to the resist shape, the optical upper width PWA is in proportion to the optical lower width PWB at a constant ratio. Therefore, the pole resistance value of the main pole layer contains information with respect to the optical upper width PWA and optical height PT of its pole portion.

On the other hand, the MWW of the thin-film magnetic head is greatly affected by the optical width PWA and the optical height PT of the pole portion and by their interaction, and approximately decided by them. Therefore, the relative value of the pole resistance of the pain pole layer corresponds to the relative value of the MWW, and also the distribution of the pole resistance values of the main pole layers in the wafer will cope with the distribution of the MWW.

Figure 13A:
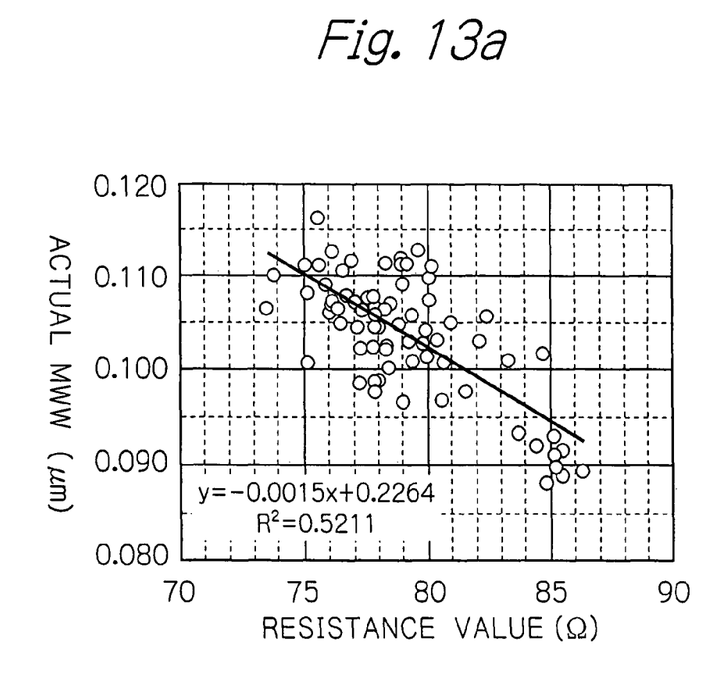
FIG. 13a shows a characteristic view illustrating a relationship between an electrical resistance value of the main pole layer and an actual MWW.

A thin-film magnetic head with a main pole layer whose pole resistance value was preliminarily measured was assembled into HGA, and an actual MWW thereof was measured. FIG. 13a indicates the result of this measurement. As will be noted from the figure, there is clear correlation between the measured pole resistance value and the measured actual MWW. Because the distribution characteristic of MWW can be obtained by measuring the pole resistance value as for the thin-film magnetic head on the wafer, the method according to the present invention is extremely useful.

Figure 13B:
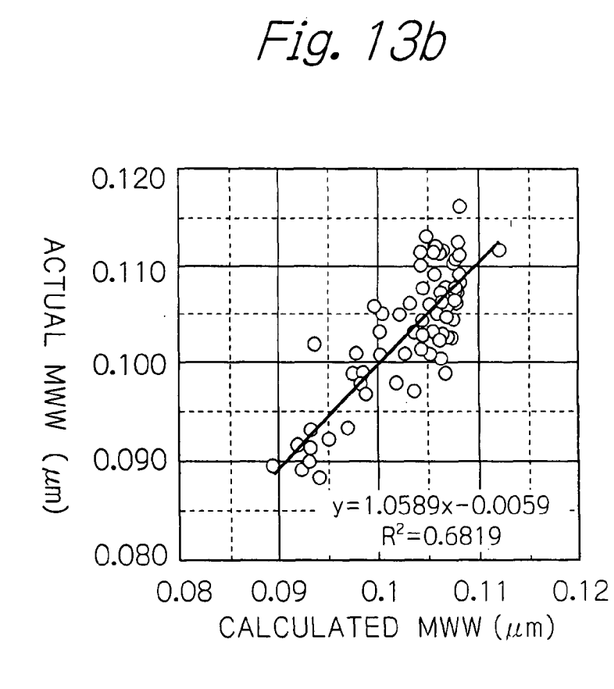
FIG. 13b shows a characteristic view illustrating a relationship between a calculated MWW and an actual MWW.

It is possible to obtain a better correlation in precision by incorporating a regression equation of MWW=(a×PWA)+(b×PT)+(c×resistance value)+d as shown in FIG. 13b from the optical upper width PWA and the optical height PT of the pole portion, where a, b, c and d are constants obtained by a regression analysis.

Figure 14:
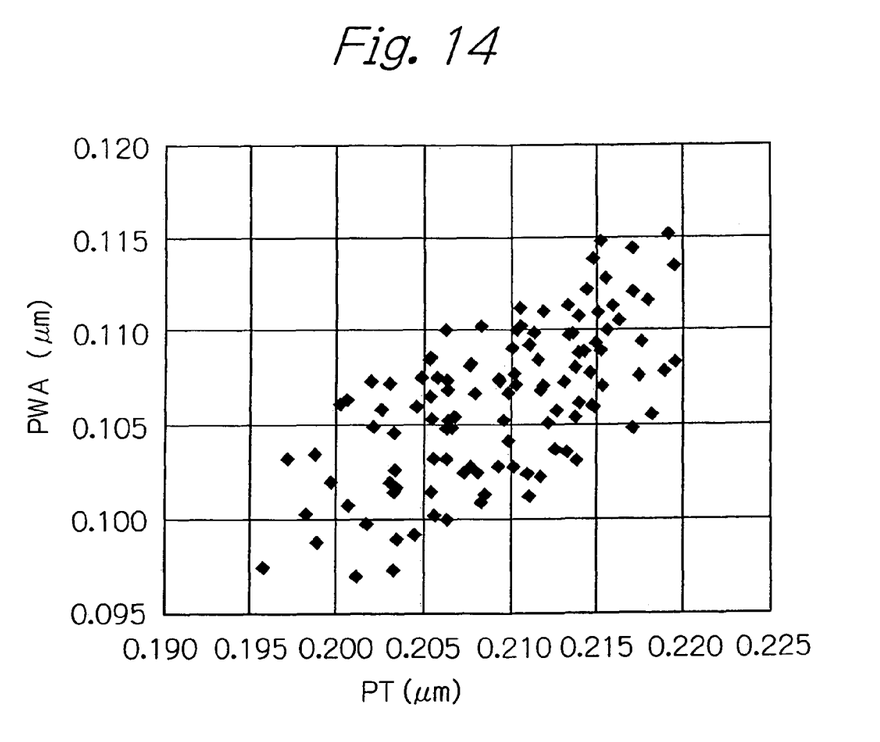
FIG. 14 shows a characteristic view illustrating a relationship between an optical height PT and an optical width PWA of the main pole layer.

There is a correlation as shown in FIG. 14 between the optical upper width PWA and the optical height PT of the pole portion of the main pole layer. Because the cross section of the pole portion has a reverse trapezoid shape, there is a correlation between the PWA and PT such that the PWA increases when the PT increases as shown in the figure. Therefore, if either one of the PT and the PWA is given, the other one can be easily estimated.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A testing method of a wafer provided with a plurality of thin-film magnetic heads, each of said plurality of thin-film magnetic heads including a main pole layer, a first test pad formed on said wafer and electrically connected with an extended top end section of said main pole layer and a second test pad formed on said wafer and electrically connected with a back end section of said main pole layer, said testing method comprising the steps of:

measuring an electrical resistance between said first test pad and said second test pad;

judging whether the measured electrical resistance is within a set range; and discriminating that the thin-film magnetic head is a non-defective product when the measured electrical resistance is within the set range.

2. The testing method as claimed in claim 1, wherein the measuring step, the judging step and the discriminating step are executed for all of the thin-film magnetic heads on said wafer.

3. The testing method as claimed in claim 1, wherein said extended top end section of said main pole layer is an end section extended outside of a location of an air bearing surface of said thin-film magnetic head.

4. The testing method as claimed in claim 1, wherein said second test pad is electrically connected with said back end section of said main pole layer via a write shield layer of said thin-film magnetic head.

5. A manufacturing method of a thin-film magnetic head comprising the steps of:

forming a plurality of thin-film magnetic heads on a wafer such that each of said plurality of thin-film magnetic heads includes a main pole layer, a first test pad formed on said wafer and electrically connected with an extended top end section of said main pole layer and a second test pad formed on said wafer and electrically connected with a back end section of said main pole layer;

measuring an electrical resistance between said first test pad and said second test pad;

judging whether the measured electrical resistance is within a set range; and discriminating that the thin-film magnetic head is a non-defective product when the measured electrical resistance is within the set range.

6. The manufacturing method as claimed in claim 5, wherein said method further comprises a step of discriminating that the thin-film magnetic head is a defective product to be excluded from shipped products when the measured electrical resistance is not within the set range.

7. The manufacturing method as claimed in claim 5, wherein the measuring step, the judging step and the discriminating step are executed for all of the thin-film magnetic heads on said wafer.

8. The manufacturing method as claimed in claim 5, wherein said extended top end section of said main pole layer is an end section extended outside of a location of an air bearing surface of said thin-film magnetic head.

9. The manufacturing method as claimed in claim 5, wherein said second test pad is electrically connected with said back end section of said main pole layer via a write shield layer of said thin-film magnetic head.

10. The manufacturing method as claimed in claim 5, wherein said method further comprises a step of cutting said wafer to obtain a plurality of row bars each having a plurality of thin-film magnetic heads aligned, a step of lapping an air bearing surface of each of the plurality of row bars, and a step of cutting the lapped row bar to separate into individual thin-film magnetic heads.

11. The manufacturing method as claimed in claim 10, wherein said lapping step comprises controlling a lapping amount by monitoring a resistance value of a lapping sensor.

12. The manufacturing method as claimed in claim 10, wherein said method further comprises a step of preliminarily lapping a reference row bar cut from said wafer, a step of measuring a resistance value of a lapping sensor of the lapped reference row bar, and a step of measuring a magnetic write width of every thin-film magnetic head cut from the reference row bar.

13. The manufacturing method as claimed in claim 12, wherein said method further comprises a step of calculating a magnetic write width of every thin-film magnetic head of an intended row bar other than said reference row bar obtained from said wafer, from a difference between the electrical resistance of the every thin-film magnetic head in the intended row bar and the electrical resistance of the every thin-film magnetic head obtained from the reference row bar, when the resistance values of the lapping sensors are the same in the intended row bar and the reference row bar.

14. The manufacturing method as claimed in claim 13, wherein said method further comprises a step of lapping said intended row bar by monitoring the resistance value of the lapping sensor in said intended row bar so that a difference between an aimed magnetic write width and the calculated magnetic write width becomes zero.

* * * * *